April 30, 1935.                J. PETERSON                1,999,944
NONSKID DEVICE
Filed Jan. 5, 1934

Inventor:
John Peterson

Patented Apr. 30, 1935

1,999,944

UNITED STATES PATENT OFFICE 1,999,944

NONSKID DEVICE

John Peterson, Cedarhurst, N. Y.

Application January 5, 1934, Serial No. 705,416

1 Claim. (Cl. 152—14)

This invention relates to non-skid devices for motor vehicles and has for the primary object the provision of a device of the above stated character which may be easily and quickly applied or removed from a wheel and its tire without the necessity of elevating the tire from the ground and when applied will provide efficient traction to the tire under all road conditions and will prevent both lateral and circumferential skidding of the tire and may be readily adjusted to tires of different sizes and also to wheels of different types.

With these and other objects in view this invention consists in certain novel features of construction, combination and arrangement of parts to be hereinafter more fully described and claimed.

For a complete understanding of my invention, reference is to be had to the following description and accompanying drawing, in which Figure 1 is a fragmentary side elevation illustrating a motor vehicle wheel and its tire with an anti-skid device applied thereto and constructed in accordance with my invention.

Figure 1:
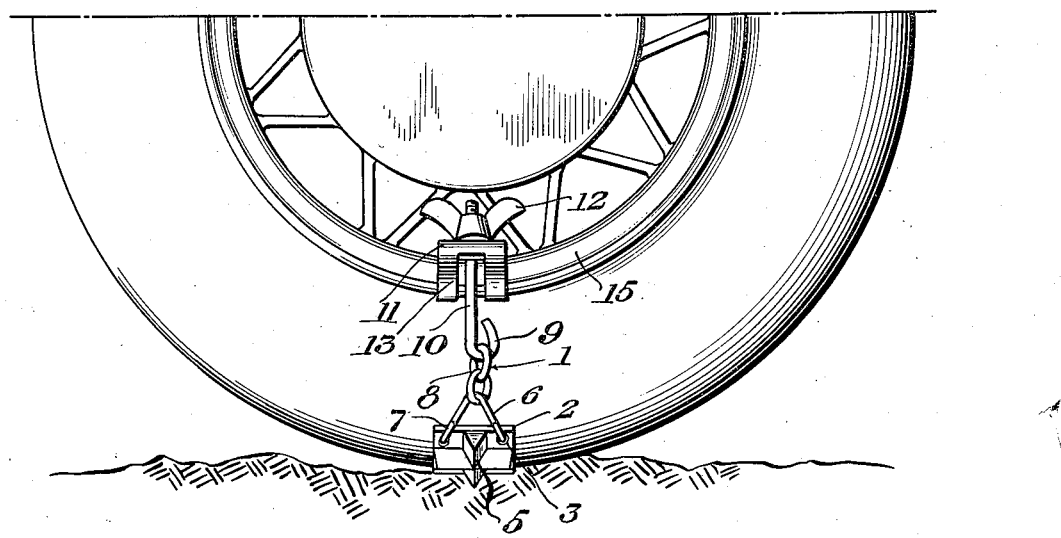
Figure 2:
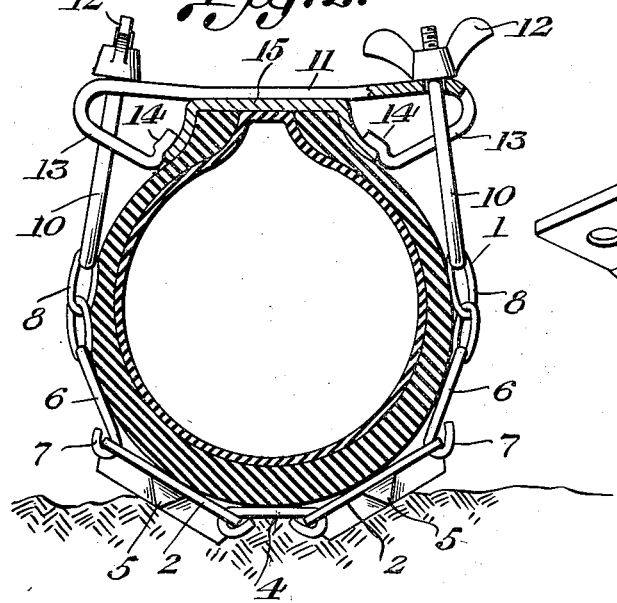
Figure 2 is a transverse sectional view illustrating the same.
Figure 3:
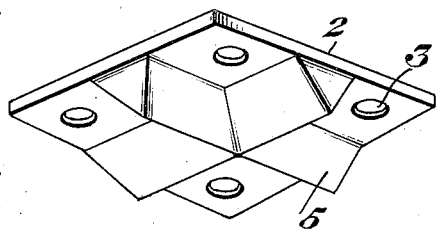
Figure 3 is a perspective view illustrating one of the non-skid plates.

Referring in detail to the drawing, the numeral 1 indicates a non-skid device or unit to be applied to a tire and its wheel, as shown in Figures 1 and 2 of the drawing, and it is to be understood that the tire and wheel may have any number of such units installed thereto without the necessity of elevating the tire away from the ground.

The unit 1 consists of a pair of non-skid plates 2 each of substantially rectangular shape and provided with openings 3. The plates 2 are joined by links 4. As will be seen from the drawing, these links pass through certain of the apertures 3 of the plates and when the device is applied to the tire the links are positioned over the central portion of the tire with the plates disposed at an inclination to each other and thereby conforming to the transverse curvature of the tire. The outer faces of the plates 2 have formed integrally therewith ribs 5 each of substantially triangular shape in cross section and the ribs of each plate intersect one another and are arranged at right angles to each other. The ribs are adapted to bite into the roadway and will prevent the tire from skidding laterally or circumferentially.

Substantially V-shaped elements 6 have their ends bent to form hooks 7 engageable with the other apertures 3 of the plates. Chains or flexible elements 8 are connected with the elements 6 and the end links receive hooks 9 formed integrally with connecting rods 10. The rods 10 extend through apertures in a connecting plate 11 and have threaded thereon wing nuts 12. The connecting plate 11 is arranged transversely of the felly of the wheel and is bent upon itself to form hook-shaped portions 13 each bifurcated to permit the rod 10 to extend therethrough. The ends of the hook-shaped portions are bent or offset, as shown at 14, to engage with the flanges of the rim 15 for the tire. Of course, this rim may be of the demountable type or may be the felly of the wheel. The offset portions 14 prevent the hook-shaped portions 13 from digging into the walls of the tire and also aid in retaining the attaching plate to the rim or the felly. A device of this character may be readily adjusted to tires of different sizes and to wheels of different types.

Having described the invention, I claim:

An anti-skid device comprising a non-skid tread medium, flexible elements connected to said tread medium, attaching rods connected with the flexible elements and screw threaded, a connecting plate apertured to receive said rods and engaging the felly of a wheel, nuts threaded to said rods and engaging the connecting plate, said connecting plate bent upon itself to form hook-shaped portions bifurcated to receive the rods and having their ends offset to engage with the flanges of the rim of a tire.

JOHN PETERSON.